United States Patent Office 2,802,402
Patented Aug. 13, 1957

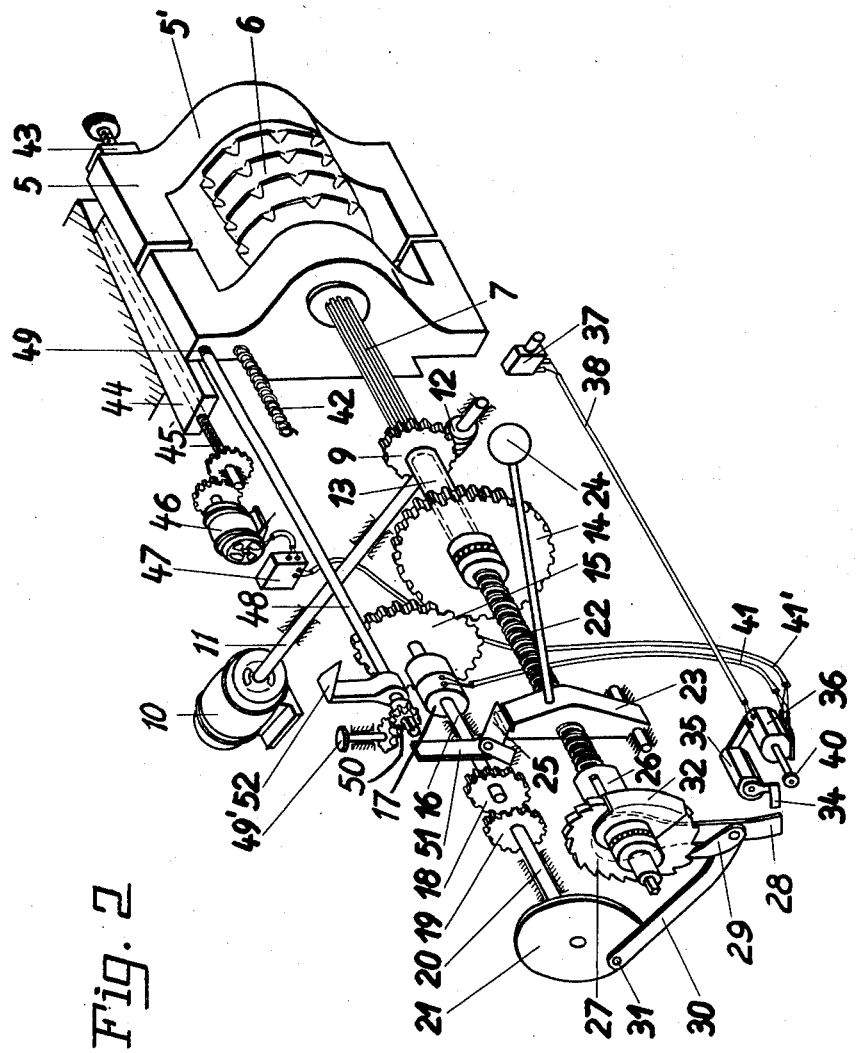

2,802,402

DEVICE FOR THE AXIAL MOVEMENT OF PROFILE-SHAPERS IN GEAR SHAPING MACHINES

Ernst Perger, Wuppertal, Germany, assignor to Firma Maschinenfabrik Rudolf Staehely, Wuppertal-Nachstebreck, Germany, a corporation of Germany Application December 1, 1953, Serial No. 395,512

Claims priority, application Germany December 27, 1952

6 Claims. (Cl. 90—4)

The present invention relates to a device for axial movement of profile-shapers in gear shaping machines for the purpose of equal wear of the shaper teeth, particularly in the use of rolling profile-shapers.

It has been proposed before to provide means for stepwise axial movement of the shaper in rolling shaping machines, particularly in gear shaping machines, in order to bring about equal wear of the shaper teeth. The stepwise movement of the shaper results in highest working precision combined with a high output compared with the known method of constant movement of the shaper for the same purpose, which method requires, however, a more complicated adjustment mechanism and permits the mounting of the shaper in a slide-seat only which prevents free movement.

It has been further proposed to provide a special drive for the stepwise movement of the rolling shaper and the driving motor is controlled responsive to the strokes of the shaping machine, so that the axial movement of the shaper is achieved automatically.

It has been found, however, that such arrangement brings about construction difficulties, which lead to appreciable drawbacks. In particular, it has been found that the known structure results in a comparatively high time loss for the return stroke of the shaper into its original position. The arrangement of a special driving motor is also required which amounts to an additional structure. Though it is known in connection with shaping machines having a continuously movable shaper to take the drive for the gear from the drive of the shaper shaft and to provide a symmetrical turn drive, so that a mechanical working stroke as well as return stroke is achieved, appreciable time is still required for both strokes. By using this working method a centering of the tooth relative to the workpiece is, however, impossible and for this reason an adjustment must be provided upon reversal of the moving direction of the shaper which is cumbersome and time consuming.

It is, therefore, one object of the present invention to provide a device which includes means for limiting the time for the return stroke of the shaper from its end position to its original position by means of a fast return movement of the shaper slide which is independent from the moving speed of the shaper during its working stroke.

It is another object of the present invention to provide a gear shaping machine in which the shaper shaft carries at its extended end a rotatable yet axially immovable bushing having outer threads, said shaper shaft projecting through an immovable bushing for axial movement, said first mentioned bushing being adapted to engage an immovable locking nut which may be rendered inoperative and which first mentioned bushing also carries an immovable shifting gear operated by the shifting drive.

Due to this arrangement an appreciable time economy is brought about during operation of high speed rolling shaping machines due to the fact that the return stroke for the shaper slide may be performed at high speed. Furthermore, this arrangement provides also a forced drive depending upon the operation of the shaper so that a shaper movement is brought about by extremely simple means.

It is yet another object of the present invention to provide a rolling shaping machine in which the axially moving working stroke for the shaper is terminated with simple and safely operating means which also permit of selection of the length of the total working stroke depending upon the shaper width and the diameter of the workpiece. In order to achieve this end, the shaper slide is equipped with an adjustable coupling rod the end of which works against a pawl arresting the locking nut in the end position of the shaper slide which is springbiased.

It is a still further object of the present invention to provide a device for the axial movement of profileshapers in gear shaping machines in which a bushing is mounted on the shaper-shaft, which bushing carries outer thread and is turnable on the shaper-shaft, yet not movable in axial direction and which bushing is guided in a properly positioned but disengageable nut, whereby a ratchet wheel is disposed at the end of the bushing and a pawl engages the said ratchet wheel, which pawl is operated by an intermediate drive of the shaping-shaft, the said intermediate drive being put into operation by means of a coupling.

It is yet a still further object of the present invention to provide a device for the axial movement of profileshapers in gear shaping machines which includes shifting means operated by a cooperation of a ratchet wheel with a gear drive which permits a stepwise shifting, down to the dimension of a micron, so that it is adjustable to any pitch.

It is also a still further object of the present invention to provide a device for the axial movement of profileshapers in gear shaping machines which includes at least as part of the shifting means a ratchet wheel cooperating with a pawl, in which the latter is secured to one end of a crank-lever, while the other end of the latter is pivoted to the crank-wheel of the shaft of the intermediate drive.

It is now also another object of the present invention to provide a device for the axial movement of profileshapers in gear shaping machines which includes as part of the shifting means a ratchet wheel cooperating with a pawl, whereby an adjustable disk is provided which partly covers up the teeth of the ratchet wheel, in order to vary the shifting stroke in a simple manner.

It is yet another object of the present invention to provide a device for the axial movement of profile-shapers in gear shaping machines which includes as part of the shifting means a ratchet wheel cooperating with a pawl which is secured to one end of a crank-lever, which end of the said crank-lever operates a switch connected with a counting device, thereby providing a simple electrical control of the shifting means.

It is still another object of the present invention to provide a device for the axial movement of profile-shapers in gear shaping machines in which two movements are provided in overlapping manner, in order to bring about a properly operating control.

It is yet a further object of the present invention to provide a device for the axial movement of profile-shapers in gear shaping machines in which the shifting means include an electric switch operated by the shaper carrying slide in its rearmost position, which electric switch is connected with an electric counting device which in turn is electrically connected with a commutator and from which an electrical connection leads to a magnetic coupling of the intermediate drive for the shaper-shaft.

It is still another object of the present invention to provide a device for the axial movement of profile-shapers in gear shaping machines which includes an electrical control for the movable shaper carrying slide during the shaping process by means of jamming, and by providing for this purpose an electric motor which is in parallel with the magnetic coupling, which electric motor operates a locking wedge for the shaper carrying slide.

It is finally still another object of the present invention to provide a device for the axial movement of profile-shapers in gear shaping machines which includes simple and safely operating means for stopping the axial movement of the profile-shapers which means include an adjustable disengagement rod disposed on the shaper carrying slide, the end of the said disengagement rod operating a catch which arrests a locking nut in the end position of the shaper carrying, spring biased slide.

With these and other objects in view, which will become apparent in the following detailed description, the present invention will be clearly understood in connection with the accompanying drawings, in which:

Fig. 2 is a perspective top view of the drive disposed in the shaper head.

Figure 1:
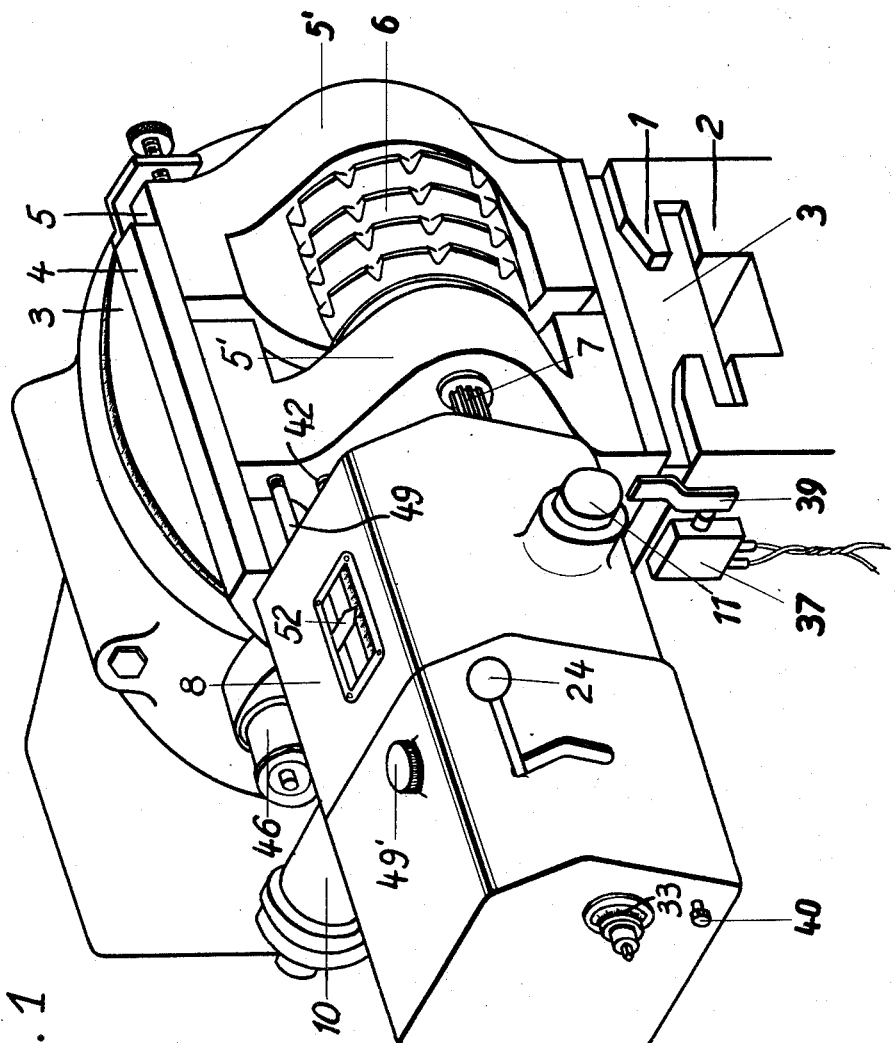
Figure 1 is a perspective front view of the shaper-head.

Referring now to the drawings, the present device comprises a frame 2 which is equipped with a guide 1 in which a slide 3 is movably mounted. The latter carries at its head plate 4 a slide 5 between the bearing cheeks 5' of which is disposed a rolling profile-shaper 6. The shaft 7 carrying the shaper 6 extends at one side and projects into a drive housing 8 which is disposed in sideward extension of the head plate 4.

The housing 8 covers a worm gear 9 axially movable on the shaper-shaft 7 which for this purpose is partly keyed for a length equivalent to the axial stroke thereof, the said worm gear 9 meshing a worm 12 which is mounted on the shaft 11 driven by the driving motor 10. The worm gear 9 is connected with a gear 14 by means of a bushing 13, which gear 14 meshes the gear 15 mounted on the shaft 16 of an intermediate drive. The shaft 16 is divided and carries a magnetic coupling 17 which connects both parts of the shaft 16. A shaft 20 carrying a crank wheel 21 is in driving connection with the shaft 16 by means of a pair of gears 18, 19.

The shaper-shaft 7 carries a bushing 22 which has outer thread and is rotatably, but axially immovably mounted on the shaper-shaft 7. A locking nut 23 having complementary thread engages the bushing 22 in locking position, which locking nut 23 is turnably mounted in the housing 8. A handle 24 shifts the locking nut 23 into the respective operative and inoperative positions. In locking position the catch 25 arrests the locking nut 23 in its operative position.

The bushing 22 is slotted at its end 26 and carries on its slotted portion a ratchet wheel 27 which is mounted for axial movement but not rotatable on the bushing 22, and the said ratchet wheel 27 is equipped with a key received by the slot of the bushing 22. A swing arm 28 which carries a pawl 29 is pivoted to the pin 31 of the crank-wheel 21 by means of a crank-lever 30.

A cover 32, which is adjustable as to its angular position within the range of the pawl stroke, lies over the teeth of the ratchet wheel 27. This cover 32 may be adjusted by means of a positioning device 33 disposed outside of the housing 8.

An arm 34 of an electric switch 35 is disposed within the range of the swing arm 28, which switch 35 is electrically connected with a counting device 36. The latter is in a circuit 38 of a contact switch 37 which is operated by an engaging arm 39 of the slide 3, when the latter reaches its rearmost end position.

An adjustment head 40 of the counting device 36 permits the setting of the latter to a predetermined number of strokes, so that upon performing the predetermined number of strokes the circuit 41, in which the magnetic coupling 17 is disposed, is closed.

The slide 5 is biased by a spring 42 which urges the slide 5 into the starting position for the shaping work towards a, preferably, adjustable abutment member 43. The slide 5 is secured, in its working position, by means of a wedge 44. For this purpose, an adjustment spindle 45 is provided which is operated by an auxiliary motor 46.

The auxiliary motor 46 is disposed in the circuit 41' of the magnetic coupling 17 over a relay 47.

Furthermore, the slide 5 is equipped with a disengagement rod 48 which carries thread 49 to be received in a threaded boring of the slide 5. The disengagement rod 48 extends into a bevelled gear 50 which is axially immovably but rotatably disposed in the housing 8, the rotation of the bevelled gear 50 being achieved by means of a regulating wheel 49', and which bevelled gear 50 is connected to the disengagement rod 48 by means of slot and key and, thus turns the disengagement rod 48 upon its own rotation, so that the latter may be adjusted relative to the slide 5.

An angular lever is disposed within the range of the end of the disengagement rod 48, which lever is connected with the catch 25. The degree of adjustment may be preferably made visible by means of an indicator 52.

The described drive operates in the following manner:

A single engagement of the shaper with the workpiece finishes the latter.

Before starting the shaping operation, one or a plurality of engagement movements is set on the counting device 36 in accordance with the standing up of the shaper edge depending upon the workpieces to be worked.

Furthermore, the stroke of the axial advance of the shaper-shaft 7 in correspondence with the graduation of the shaper 6 is fixed by means of the adjustment device 33 through exposure of a corresponding number of teeth of the ratchet wheel 27.

A length corresponding with a multiple of the axial advance stroke is then set on the disengagement rod 48 and the indicator 52, respectively, by means of the setting wheel 49'. This length relates to the useful width of the shaper.

Thereafter, the lever 24 may be shifted into operative position, thereby rendering the shaping machine ready for operation, since the locking nut 23 (shaft-lock) locks the shaper-shaft 7.

The magnetic coupling 17 is in this position disengaged, while the wedge 44 is in operative position.

During the shaping operation the slide 3 is advanced towards the workpiece. The motor 10 drives the shaper-shaft 7 over the worm drive 9, 12, while the intermediate drive 14, 15 idles.

If the slide 3 is withdrawn upon finishing the workpiece, the abutment arm 39 operates the switch 37 and the counting device 36 moves ahead for the value "1." If a number of pulses, corresponding with the number previously set, is sent into the counting device 36, the latter closes the circuit 41 of the magnetic coupling and the circuit 41' of the motor 46.

In this manner the coupling 17 is put into operative position, so that the intermediate drive together with the crank wheel 21 starts operation. Simultaneously the motor 46 releases the wedge 44.

The crank-lever 30, pivoted to the crank-wheel 21, operates now the swing arm 28. The swinging stroke of the latter causes the pawl 29 to move the ratchet wheel 27, turning, thereby, also the threaded bushing 22. The latter moves together with the shaper-shaft in axial direction under the stationary lock nut 23, whereby the slotted part of the shaper-shaft 7 slides in the driving worm gear 9 and its hub 13. The slide 5 slides likewise in its guide on the head plate 4.

The swing arm 28 operates the arm 34 of the electric switch 35, during its swinging movement, the latter opening the circuit 41 which was closed by the counting device 36. Thereby, the magnetic coupling 17 is set again into inoperative position and the crank-wheel 21 stops its rotation. The relay 47 brings about consequently the return movement of the motor 46, so that the wedge 44 secures again the slide carrying the shaper.

The pawl 29 travels during one revolution of the crank-wheel 21 for a length which equals to a multiple of the pitch of the ratchet wheel 27. By partly covering the ratchet wheel by means of the cover 32 the angular movement of the ratchet weel 27 may be shortened.

In achieving the opposite effect, the angular movement of the ratchet wheel 27 is increased, if by corresponding setting of the switch 35, the latter is operative only upon repeated operation.

Due to this combination, it is possible to provide in connection with the thread pitch of the bushing 22 a very small axial stroke, so that an axial movement is brought about which is within the working tolerances.

If during the shaping process the slide 5 has advanced so much that a further advance may not be permitted, the disengagement rod 48 abuts during the advance movement the lever 51. The catch is then lifted and the locking nut 23 falls out from its locking position. The slide 5 is then again returned to its original position by means of the spring 42, namely into abutment position with the abutment member 43.

It is now necessary to change the shaper, whereupon the working process may be continued in the described manner.

It is of course possible to provide a mechanical release of the device instead of the electrical release as described above.

While I have disclosed one embodiment of the present invention, it is to be understood that this embodiment is given by example only and not in a limiting sense, the scope of the present invention being determined by the objects and the claims.

I claim:

1. A device for the axial stepwise movement of shapers for equal wear of the teeth of the shaper, particularly of rolling profile-shapers, comprising a frame and a slide movably mounted on the said frame, means for operating the said slide towards a work-piece, a shaper-shaft axially movable and carried by the said slide, first means for driving the said shaper-shaft, the said first driving means including a gear, and second driving means operated by the said gear for axial movement of the said shaper-shaft, and a bushing having outer threads and rotatably, yet axially immovably, mounted on the said shaper-shaft, and a stationary locking nut disengageably locking the said bushing, the said bushing carrying at one end a ratchet gear, and a pawl operated by the said second driving means engaging the said ratchet gear.

2. The device, as set forth in claim 1, in which the said second driving means include a drive shaft, a crank wheel, secured to one end of the said drive shaft, and a crank lever, one end of which is pivotally secured to the said crank wheel while its other end is pivotally secured to the said pawl, thereby connecting the latter with the said crank wheel.

3. The device, as set forth in claim 1, which includes a cover member disposed over the said ratchet gear, the said cover member covering selectively a greater or smaller number of teeth of the said ratchet gear, and an adjustment secured to the said cover member for adjustment of the latter.

4. The device, as set forth in claim 3, which includes a swing arm mounted on the said bushing and carrying the said pawl, and a second switch having an arm, the said second switch being adapted to open an electric current closed by the said counting unit, and the said arm of the said second switch being disposed in the operating plane of the said swing arm.

5. The device, as set forth in claim 4, in which the said switch operated by the abutment arm of the said slide is disposed in the circuit of the counting unit.

6. The device, as set forth in claim 5, in which the said coupling unit is formed as electro-magnetic coupling and a first electric conduit connecting the said electro-magnetic coupling with the said counting unit, and an electric motor and a second electric conduit connecting the said electric motor with the said counting unit, and a wedge member for securing the slide for the said shaper, and means for operating the said wedge member by means of the said electric motor.

References Cited in the file of this patent
UNITED STATES PATENTS

| | | |
|---|---|---|
| 2,481,974 | Bradner | Sept. 13, 1949 |
| 2,484,856 | Purvin | Oct. 18, 1949 |
| 2,537,967 | Carlin | Jan. 16, 1951 |
| 2,629,290 | Staples et al. | Feb. 24, 1953 |